United States Patent
Perotti et al.

(10) Patent No.: US 10,432,623 B2
(45) Date of Patent: Oct. 1, 2019

(54) COMPANION OUT-OF-BAND AUTHENTICATION

(71) Applicant: Plantronics, Inc., Santa Cruz, CA (US)

(72) Inventors: Erik Perotti, Santa Cruz, CA (US); Roman J Ryan, Santa Cruz, CA (US)

(73) Assignee: Plantronics, Inc., Santa Cruz, CA (US)

( * ) Notice: Subject to any disclaimer, the term of this patent is extended or adjusted under 35 U.S.C. 154(b) by 166 days.

(21) Appl. No.: 15/382,459

(22) Filed: Dec. 16, 2016

(65) Prior Publication Data
US 2018/0176215 A1    Jun. 21, 2018

(51) Int. Cl.
*G06F 7/04* (2006.01)
*H04L 29/06* (2006.01)
*H04W 12/06* (2009.01)
*H04W 76/10* (2018.01)
*H04W 4/80* (2018.01)

(52) U.S. Cl.
CPC ........ *H04L 63/0861* (2013.01); *H04L 63/083* (2013.01); *H04W 4/80* (2018.02); *H04W 12/06* (2013.01); *H04W 76/10* (2018.02)

(58) Field of Classification Search
None
See application file for complete search history.

(56) References Cited

U.S. PATENT DOCUMENTS

2009/0249478 A1\* 10/2009 Rosener ............... G06F 21/31
726/19
2014/0090039 A1\* 3/2014 Bhow .................. H04W 12/06
726/7

OTHER PUBLICATIONS

Unknown, Voicevault, "Voice Biometric Out of Band Authentication," found at URL <http://voicevault.com/voice-biometric-solutions/out-of-band-authentication/>, on Jun. 16, 2016.
Unknown, Authentify, "Out-of-Band Authentication (OOBA)—Authentify," found at URL <http://authentify.com/solutions/authentivation-concepts/band-authentication/>, on Jun. 17, 2016.

\* cited by examiner

*Primary Examiner* — Brandon S Hoffman
(74) *Attorney, Agent, or Firm* — Chuang Intellectual Property Law (57) ABSTRACT

Methods and apparatuses for user authentication are described. In one example, authenticating a user includes establishing a first wireless communication link between a headset and a first computing device and a second wireless communication link concurrent with the first wireless communication link between the headset and a second computing device. A user authentication request is received at the first computing device from a secure system. The user authentication request is transmitted from the first computing device to the headset. An authentication response is transmitted to the secure system utilizing the second computing device and the second wireless communication link.

28 Claims, 9 Drawing Sheets

COMPANION OUT-OF-BAND AUTHENTICATION

BACKGROUND OF THE INVENTION

User authentication can be understood to be the act of proving to a computer-based system that a user is who she or he claims to be (i.e., authentication of the identity of the user). User authentication is often described in terms of something you know (e.g., a password), something you have (e.g., an ATM card), or something you are (e.g., fingerprint). User authentication is the process of verifying one or more of these factors.

For example, a typical computer user is required to authenticate himself for a wide variety of purposes, such as logging in to a computer account, retrieving e-mail from servers, accessing certain files, databases, networks, web sites, etc. In banking applications, a bank account holder is required to enter a personal identification number (PIN) in order to access an automated teller machine (ATM) to conduct a banking transaction. The need for secure authentication is accelerating in response to more and more sophisticated and creative methods of breaching systems and compromising information.

The main problem to be solved is authenticating in a convenient and secure way. Many systems for user authentication are available although none are completely satisfactory. For example, existing authentication solutions typically have a user type a password or personal identification number (PIN), also called credentials.

Using passwords is both tedious and often not very secure. For example, others can see or overhear passwords. A major problem is remembering multiple passwords and users are forced either to use the same password for all authentication systems (not secure) or forever recover/reset passwords as they become forgotten. Broadly speaking, there is a continuum with passwords—those that are easy to remember and those that that are obscure, making them harder to guess. Users may choose very simple, easily ascertained passwords. If a more difficult password is chosen, the user may write the password down, making it subject to theft.

As a result, improved methods and apparatuses for user authentication are needed.

BRIEF DESCRIPTION OF THE DRAWINGS

The present invention will be readily understood by the following detailed description in conjunction with the accompanying drawings, wherein like reference numerals designate like structural elements.

DESCRIPTION OF SPECIFIC EMBODIMENTS

Methods and apparatuses for user authentication are disclosed. The following description is presented to enable any person skilled in the art to make and use the invention. Descriptions of specific embodiments and applications are provided only as examples and various modifications will be readily apparent to those skilled in the art. The general principles defined herein may be applied to other embodiments and applications without departing from the spirit and scope of the invention. Thus, the present invention is to be accorded the widest scope encompassing numerous alternatives, modifications and equivalents consistent with the principles and features disclosed herein.

Block diagrams of example systems are illustrated and described for purposes of explanation. The functionality that is described as being performed by a single system component may be performed by multiple components. Similarly, a single component may be configured to perform functionality that is described as being performed by multiple components. For purpose of clarity, details relating to technical material that is known in the technical fields related to the invention have not been described in detail so as not to unnecessarily obscure the present invention. It is to be understood that various example of the invention, although different, are not necessarily mutually exclusive. Thus, a particular feature, characteristic, or structure described in one example embodiment may be included within other embodiments unless otherwise noted.

In one example, a method for authenticating a user includes establishing a first wireless communication link between a headset and a first computing device and a second wireless communication link concurrent with the first wireless communication link between the headset and a second computing device. The method includes receiving at the first computing device from a secure system a user authentication request, and transmitting the user authentication request from the first computing device to the headset over the first wireless communication link. The method further includes transmitting an authentication response to the secure system utilizing the second computing device and the second wireless communication link concurrent with the first wireless communication link.

In one example, a method for authenticating a user includes establishing a first wireless communication link between a companion device and a first computing device, and establishing a second wireless communication link between the companion device and a second computing device. The method includes receiving at the companion device over the first wireless communication link from the first computing device a user authentication request, the user authentication request received at the first computing device from a secure system. The method includes receiving a user response at the companion device. The method further includes transmitting a companion device output from the companion device to the second computing device over the second wireless communication link, the companion device output operable to generate an authentication response sent to the secure system utilizing the second computing device.

In one example, the companion device is a headset. In a further example, the companion device is a wrist-worn device. The term "companion device" as used herein refers to any electronic device typically or often used or carried/worn by a user.

In one example, a head worn device includes a user input interface comprising a microphone. The head worn device includes one or more wireless communications transceivers operable to form a first wireless communication link between the head worn device and a first computing device and operable to form a second wireless communication link concurrent with the first wireless communication link between the head worn device and a second computing device. The head worn device includes a processor, and a memory. The memory includes an application program includes executable instructions to receive a user authentication request over the first wireless communication link from the first computing device, receive a user response at the user input interface, and transmit a head worn device output over the second wireless communication link concurrent with the first wireless communications link to the second computing device, the head worn device output operable to generate an authentication response sent by the second computing device to a secure system.

In one example, a headset operates acts as an authenticator, challenged by a mobile device when out-of-band authentication is required. Using the FIDO standard U2F protocol, secure second factor authentication with a headset over Bluetooth Low Energy becomes possible. In one example, the headset utilizes an NXP A7005 secure chip element. Using a headset as an option for second factor authentication increases the options available for layered, out-of-band security. The headset receives an authentication request from one device and responds through a different device. Advantageously, concurrent Bluetooth connections are used in this out-of-band process. One instance could include a Bluetooth headset connected to both a mobile device and a PC, with an authentication request coming from the PC and confirming through the mobile device.

When, for example, a transaction is initiated during an online banking session, a customer can choose to authenticate via headset. The customer's PC would then prompt his or her headset for authentication, and request verification from the headset through the simultaneously connected mobile device. By responding to a voice prompt through the headset, the customer would verify identify and acknowledge his or her intent to execute the transaction in question. By adding the headset layer to an out-of-band authentication process, greater security can be realized.

Often, security protocols such as authentication are implemented using data exchanged over a single communication channel. If this channel is compromised, the security can be compromised. In this example, two channels of communication are used: a primary "in-band" channel and a secondary "out-of-band" channel. Having secure exchanges over the out-of-band channel increases the difficulty of compromising a security system. Out-of-band authentication creates an additional layer of security, requiring a second communication channel to be utilized in order to complete verification. The out-of-band authentication process maintains security, even if one communication channel has been breached. Creating security layers that are real barriers to malicious individuals while avoiding significant inconvenience to customers and other users is a key challenge for security-conscious organizations.

Another embodiment of this out-of-band headset scenario is the interchangeable use of NFC, Bluetooth, and Bluetooth Low Energy within a single headset. By using multiple wireless communication methods in authentication, out-of-band is achieved. An example is when a PC-based identity management system requests validation through Bluetooth Low Energy from a companion device and that device must use an NFC connection with a mobile device to respond. In a further example, a PC-based identity management system requests validation through Bluetooth Low Energy from a companion device and the companion device uses a Classic Bluetooth connection with a mobile device to respond.

Figure 1:
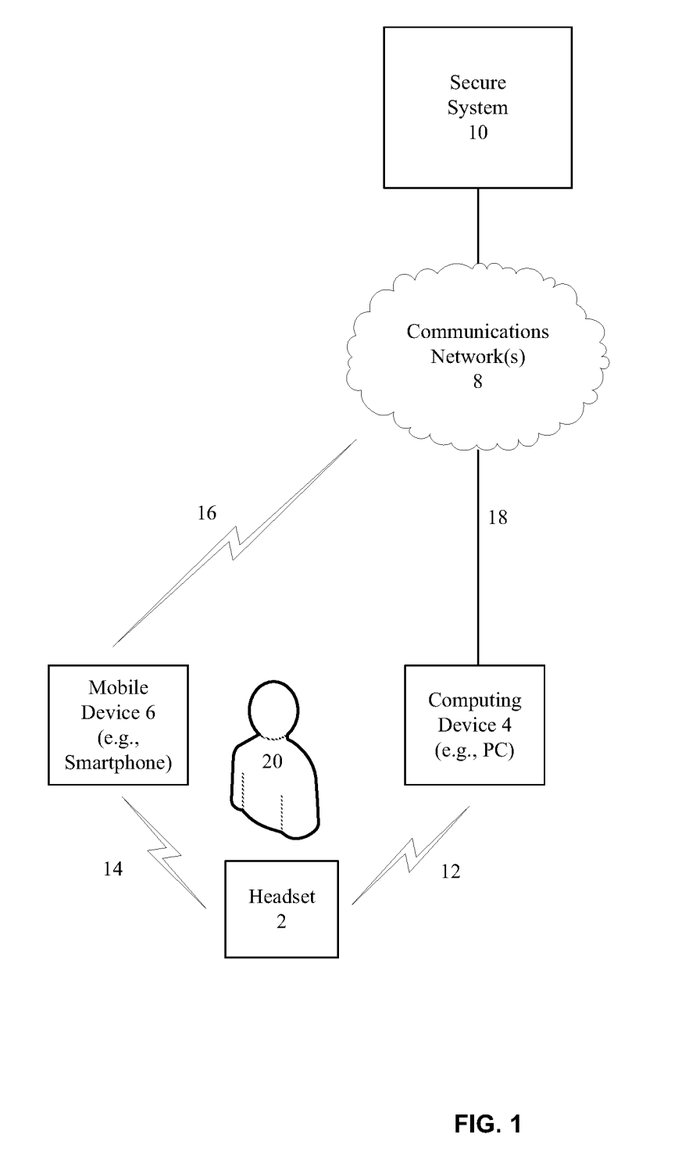
FIG. 1 illustrates a system for user authentication in one example.

FIG. 1 illustrates a system for user authentication in one example. The system includes a computing device 4, mobile device 6, and secure system 10 capable of communications there between via one or more communication network(s) 8. The system includes a headset 2 capable of communications with computing device 4 and mobile device 6. For example, communication network(s) 8 may include an Internet Protocol (IP) network, cellular communications network, public switched telephone network, IEEE 802.11 wireless network, or any combination thereof.

The headset 2, computing device 4 and mobile device 6 are in proximity to a user 20 at a user 20 location. Mobile device 6 may, for example, be any mobile computing device, including without limitation a mobile phone, laptop, PDA, headset, tablet computer, or smartphone.

Secure system 10 may be any computer system which the user 20 wishes to access to perform a desired action. For example, secure system 10 may be a website such as a financial institution website at which user 20 wishes to access account information or perform a financial transaction. Such financial transactions may include transferring funds, sending payment, or purchasing stocks. For example, user authentication may be performed at a website, such as logging onto the website at first instance, to make a purchase at the website, or as a second factor authentication.

Computing device 4 may be any device capable of communication with secure system 10 via communication network(s) 8 over network connection 18. For example, computing device 4 may be a desktop personal computer (PC), laptop computer, tablet computer, or smartphone. Network connection 18 may be a wired connection or wireless connection. In one example, network connection 18 is a wired or wireless connection to the Internet to access secure system 10. For example, computing device 4 includes a wireless transceiver to connect to an IP network via a wireless Access Point utilizing an IEEE 802.11 communications protocol. Similarly, network connection 16 may be a wired connection or wireless connection. In one example, network connection 16 is a wireless cellular communications link.

In one example, secure system 10 includes an access application interfacing with computing device 4 or mobile device 6 to authenticate the identity of user 20 to allow the user 20 to access secure system 10. In one example, secure system 10 includes user profiles which may store data associated with user 20 and other users, including authentication data operable to authenticate the identity of user 20 and contact information (e.g., mobile phone number or email address) for mobile device 6 for messaging user 20.

In one example operation, a wireless communication link 12 is established between the headset 2 and the computing device 4. A wireless communication link 14 concurrent with the wireless communication link 12 is established between the headset 2 and the mobile device 6. In one example, the wireless communication link 12 and the wireless communication link 14 concurrent with the wireless communication link 12 are Bluetooth communication links.

A user authentication request is received at the computing device 4 from the secure system 10. The user authentication request is then transmitted from the computing device 4 to the headset 2 over the wireless communication link 12. At the headset 2, a user response is received. For example, the user response includes a user spoken response. In one example, a user input may be received at the computing device 4 selecting to use the headset 2 to authenticate a user identity.

In one embodiment, user authentication is performed by the headset 2. For example, the user response is operable to authenticate an identity of the user 20. In one example, the user response is or operates as a biometric input. For example, the user spoken voice may be utilized as a biometric input, or a fingerprint may be received at the headset 2. In a further embodiment, the user response is sent to the secure system 10, whereby secure system 10 performs the user authentication utilizing the user response. For example, the user response may be an answer to a challenge question received from secure system 10.

An authentication response is sent from the headset 2 to the mobile device 6 utilizing the wireless communication link 14 concurrent with the wireless communication link 12. In the embodiment where user authentication is performed by the headset 2, the authentication response is an indication a user identity has been authenticated (or an indication that the user authentication has failed). In the embodiment where the user authentication is performed by secure system 10, for example, the authentication response sent from the headset 2 to mobile device 6 is the user response received at headset 2 and the authentication response is operable to be processed by the secure system 10 to authenticate an identity of the user 20. The authentication response is then sent to the secure system 10 from the mobile device 6 over wireless network connection 16.

In a further example operation, a wireless communication link 12 is established between a headset 2 and a computing device 4. A wireless communication link 14 is established between the headset 2 and the mobile device 6. In one example, the wireless communication link 14 between the headset 2 and the mobile device 6 is concurrent with the wireless communication link 12 between the headset 2 and the computing device 4. A user authentication request is received at the headset 2 over the wireless communication link 12 from the computing device 4 from the secure system 10.

A user response is received at the headset 2. In one example, the user response is operable to authenticate an identity of the user 20. For example, the user response is a biometric input, user input of a password, or a spoken response. In one example, the user response is processed at the headset 2 or mobile device 6 to authenticate the user. In a further example, the user response is ultimately sent to secure system 10 to authenticate the user.

A headset output is transmitted from the headset 2 to the mobile device 6 over the wireless communication link 14. Depending on the embodiment, the headset output may include an indication a user identity has been authenticated or the headset output may be the user response received at the headset 2. The headset output is operable to generate an authentication response sent to the secure system 10 utilizing the mobile device 6. Depending on the embodiment, the authentication response includes an indication a user identity has been authenticated or the authentication response is operable to be processed by the secure system 10 to authenticate an identity of the user 20.

Figure 2:
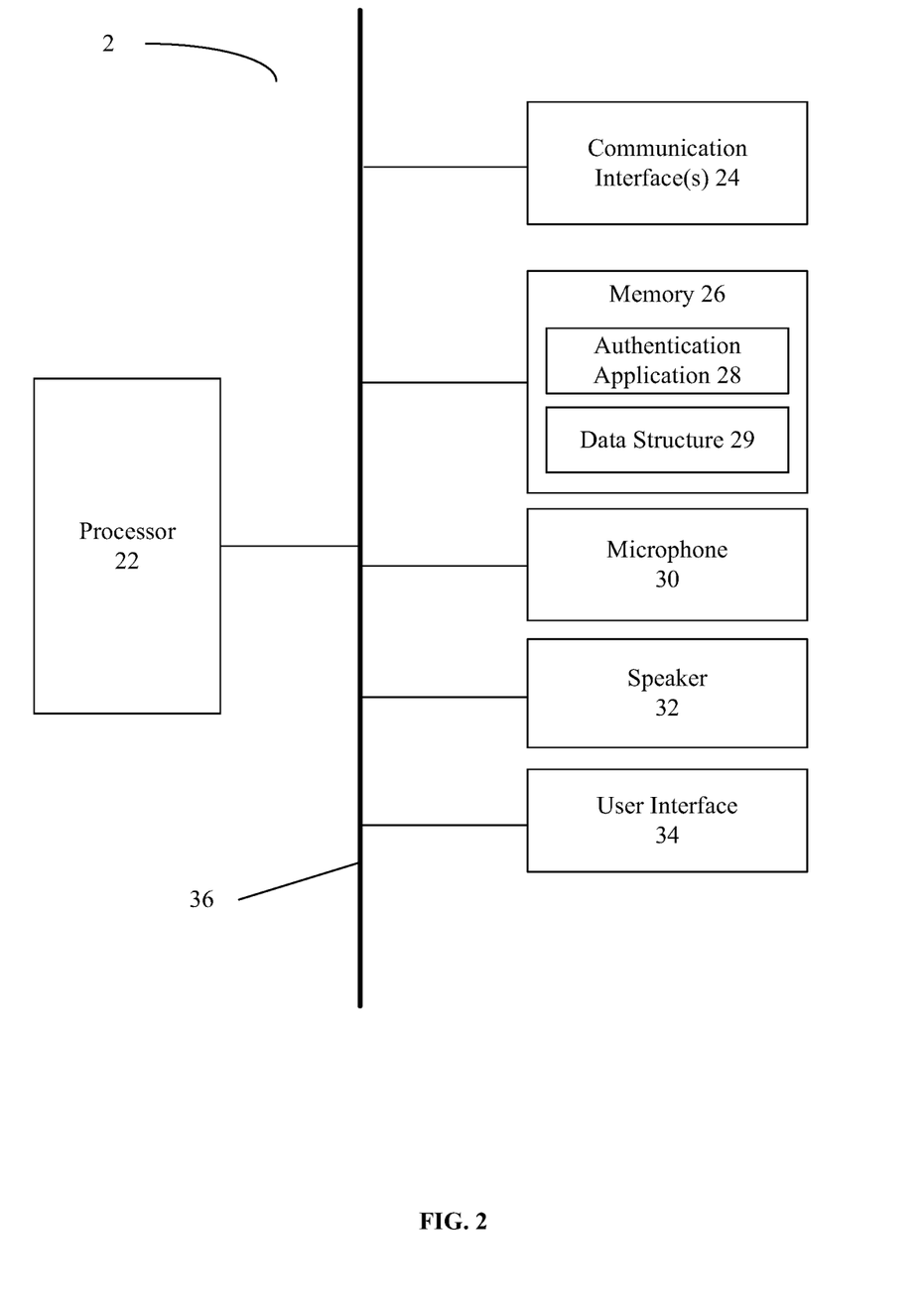
FIG. 2 illustrates a simplified block diagram of the headset shown in FIG. 1.

FIG. 2 illustrates a simplified block diagram of the headset 2 shown in FIG. 1. In one embodiment, headset 2 is capable of performing user authentication (also referred to herein as user validation) utilizing biometric identification or password verification. The headset 2 includes a processor 22 operably coupled via an interconnect 36 to a communication interface(s) 24, memory 26, a microphone 30, a speaker 32, and a user interface 34. In one example, communication interface(s) 24 operates to receive an authentication request from the computing device 4.

In one example, communications interface(s) 24 include one or more short-range wireless communications subsystems which provide communication between headset 2 and different systems or devices, such as computing device 4 and mobile device 6. For example, the short-range communications subsystem includes associated circuit components for short-range communication, a near field communications (NFC) subsystem, a Bluetooth subsystem including a transceiver, or a WiFi subsystem. The Bluetooth subsystem includes components for both Bluetooth and Bluetooth Low Energy (BLE). Communication interface(s) 24 is operable to form a first wireless communication link between the headset 2 and a computing device 4 and operable to form a second wireless communication link concurrent with the first wireless communication link between the headset 2 and a mobile device 6.

In further examples, headset 2 may include biometric input devices for authenticating the identity of user 20. For example, headset 2 may include a fingerprint scanner for scanning a user fingerprint or a retinal scanner for scanning a user retina.

Memory 26 stores a data structure 29 (e.g., a database, table, or any other file/memory structure) for storing user authentication data as described herein, and an authentication application 28 (e.g., including a voiceprint match application for comparing the voiceprint of user received speech to an authorized voiceprint stored in data structure 29). Authentication application 28 includes executable instructions to perform operations described herein. Authentication application 28 interfaces with authentication application 50 at mobile device 6 and authentication application 66 at computing device 4 as needed.

In one example, authentication application 28 includes executable instructions to receive a user authentication request over communication interface(s) 24 from the computing device 4, receive a user response at the user input interface (e.g., user interface 34 or microphone 30), and transmit a headset output over the communication interface(s) 24 to the mobile device 6. The headset output is operable to generate an authentication response sent by the mobile device 6 to the secure system 10.

Memory 26 may include a variety of memories, and in one example includes SDRAM, ROM, flash memory, or a combination thereof. Memory 26 may further include separate memory structures or a single integrated memory structure. In one example, memory 26 may be used to store passwords, network and telecommunications programs, and/or an operating system (OS).

Processor 22, using executable code and applications stored in memory, performs the necessary functions associated with user authentication and headset operation described herein. Processor 22 executes authentication application 28. Processor 22 processes user speech received at microphone 30. In one example, processor 22 is a high performance, highly integrated, and highly flexible system-on-chip (SoC), including signal processing functionality such as echo cancellation/reduction and gain control in another example. Processor 22 may include a variety of processors (e.g., digital signal processors), with conventional CPUs being applicable. User interface 34 allows for communication between the headset user 20 and the headset 2, and in one example includes an audio and/or visual interface such that an audio prompt may be provided to the user's ear and/or an LED may be lit. Processor 22 may execute a number of applications that control basic operations, such as data and voice communications via communication interface(s) 24.

Headset 2 may prompt the user 20 through speaker 32 to perform a biometric input, speak his name, speak a voice print phrase key, or speak or enter a password or challenge response. In one example, a user voice input is received at microphone 30 and voice print data is generated so that authentication application 28 may perform a voice print match by comparing the current voice print match to previous voice print data. In one example, the user voice input is a password input, and the authentication application 28 is configured to authenticate an identity of the user by comparing the user voice input with a previously established password stored in a memory (e.g., in data structure 29). In this example, the spoken user voice input is a fixed predetermined passphrase (also referred to herein as a "password" or "personal identification number (PIN)") that only the device and the user know. The user may be prompted with an audio prompt to speak the password or personal identification number. This passphrase is then received by the microphone, converted using an A/D converter, and fed into a speech recognition (also sometimes referred to in the art as "voice recognition") application to verify the correct phrase was spoken. Any speech recognition application/engine known in the art may be used. The submitted password or PIN recognized from the user speech is compared to the valid password or PIN to validate an identity of the authorized device user.

In one example, authentication application 28 does the following with respect to the authentication state of the user 20: (1) takes in user specific data (password, fingerprint, facial image, retinal scan, or voiceprint biometrics hereafter called "credentials"), (2) analyzes credentials and determines authentication status, (3) records when a successful or failed authentication occurs, (4) monitors authentication expiration time for a given user, (5) revokes authentication under specified conditions or events. Authentication application 28 operates to examine user/password data or biometric data, and generates digital credentials based on this data. In one example, the authentication application 28 has shared data or a database for its users and compares the digital credentials received to its data.

Figure 3:
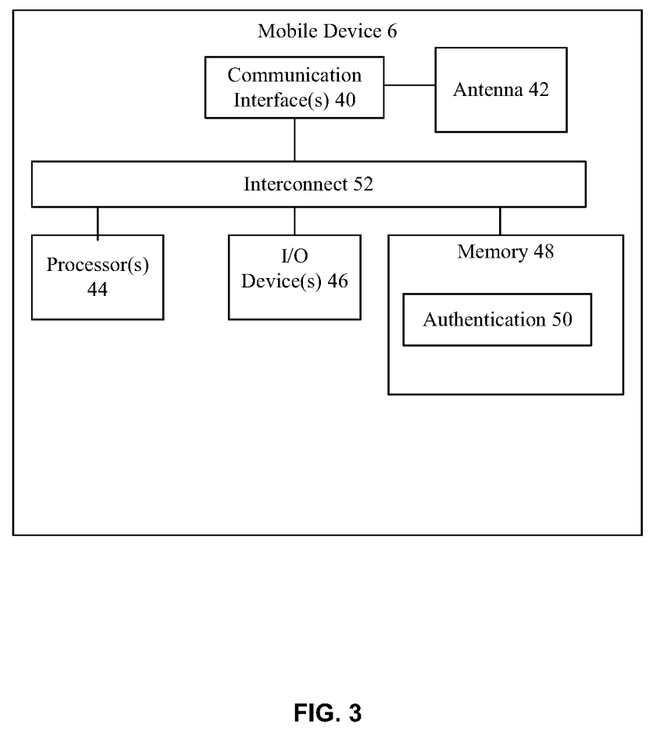
FIG. 3 illustrates a simplified block diagram of the mobile device shown in FIG. 1.

In a further example, functions described as being performed by authentication application 28 may be performed by authentication application 50 at mobile device 6. For example, authentication application 28 may take in user credentials and authentication application 50 may analyze the credentials and determine authentication status. Authentication application 50 may operate to examine user/password data or biometric data, and generates digital credentials based on this data. In one example, the authentication application 50 has shared data or a database for its users and compares the digital credentials received to its data.

FIG. 3 illustrates a simplified block diagram of the mobile device 6 shown in FIG. 1. Mobile device 6 includes input/output (I/O) device(s) 46 configured to interface with the user. I/O device(s) 46 may include input devices such as a microphone, keyboard, camera, touchscreen, etc., and one or more output devices, such as a display, speaker, etc. In some embodiments, I/O device(s) 46 may include or more of a display device, such as a liquid crystal display (LCD), an alphanumeric input device, such as a keyboard, and/or a cursor control device, and a biometric input device.

The mobile device 6 includes a processor 44 configured to execute code stored in a memory 48. Processor 44 executes authentication application 50 to perform user authentication functions described herein. In one example, authentication application 50 is operable to interface with authentication application 28 at headset 2 to confirm an identity of a user (i.e., authenticate the user).

While only a single processor 44 is shown, mobile device 6 may include multiple processors and/or co-processors, or one or more processors having multiple cores. The processor 44 and memory 48 may be provided on a single application-specific integrated circuit, or the processor 44 and the memory 48 may be provided in separate integrated circuits or other circuits configured to provide functionality for executing program instructions and storing program instructions and other data, respectively. Memory 48 also may be used to store temporary variables or other intermediate information during execution of instructions by processor 44.

Mobile device 6 includes communication interface(s) 40, one or more of which may utilize an antenna 42. The communications interface(s) 40 may also include other processing means, such as a digital signal processor and local oscillators. In one example, communications interface(s) 40 include one or more short-range wireless communications subsystems which provide communication between mobile device 6 and different systems or devices, such as headset 2. For example, the short-range communications subsystem may include an infrared device and associated circuit components for short-range communication, a near field communications (NFC) subsystem, a Bluetooth subsystem including a transceiver, or a WiFi subsystem. Interconnect 52 may communicate information between the various components of mobile device 6.

Memory 48 may include both volatile and non-volatile memory such as random access memory (RAM) and read-only memory (ROM). User authentication information, including personal identification numbers (PINs), fingerprint parameters and data, and voice print parameters and data, facial feature parameters, or other biometric data may be stored in memory 48.

Instructions may be provided to memory 48 from a storage device, such as a magnetic device, read-only memory, via a remote connection (e.g., over a network via communication interface(s) 40) that may be either wireless or wired providing access to one or more electronically accessible media. In alternative examples, hard-wired circuitry may be used in place of or in combination with software instructions, and execution of sequences of instructions is not limited to any specific combination of hardware circuitry and software instructions.

Mobile device 6 may include operating system code and specific applications code, which may be stored in non-volatile memory. For example the code may include drivers for the mobile device 6 and code for managing the drivers and a protocol stack for communicating with the communications interface(s) 40 which may include a receiver and a transmitter and is connected to an antenna 42. Communication interface(s) 40 provides a wireless interface for communication with headset 2.

Communication interface(s) 40 may provide access to a network, such as a local area network. Communication interface(s) 40 may include, for example, a wireless network interface having antenna 42, which may represent one or more antenna(e). In one embodiment, communication interface(s) 40 may provide access to a local area network, for example, by conforming to IEEE 802.11b and/or IEEE 802.11 g standards, and/or the wireless network interface may provide access to a personal area network, for example, by conforming to Bluetooth standards. In addition to, or instead of, communication via wireless LAN standards, communication interface(s) 40 may provide wireless communications using, for example, Time Division, Multiple Access (TDMA) protocols, Global System for Mobile Communications (GSM) protocols, Code Division, Multiple Access (CDMA) protocols, and/or any other type of wireless communications protocol.

Figure 4:
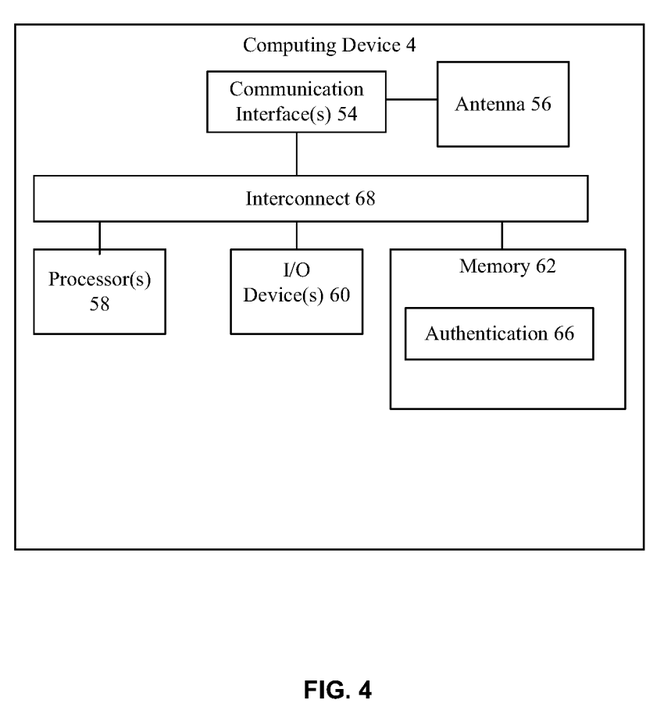
FIG. 4 illustrates a simplified block diagram of the computing device shown in FIG. 1.

FIG. 4 illustrates a simplified block diagram of the computing device 6 shown in FIG. 1. Computing device 4 includes input/output (I/O) device(s) 60 configured to interface with the user. I/O device(s) 60 may include input devices such as a microphone, keyboard, camera, touchscreen, etc., and one or more output devices, such as a display, speaker, etc. In some embodiments, I/O device(s) 60 may include or more of a display device, such as a liquid crystal display (LCD), an alphanumeric input device, such as a keyboard, and/or a cursor control device, and a biometric input device.

The computing device 4 includes a processor 58 configured to execute code stored in a memory 62. In one example, processor 58 executes a web browser application interacting with secure system 10 to receive an authentication request from secure system 10. In certain embodiments, processor 58 executes authentication application 66 to perform user authentication functions described herein. In one example, authentication application 66 is operable to interface with authentication application 58 at headset 2 to confirm an identity of a user (i.e., authenticate the user).

While only a single processor 58 is shown, computing device 4 may include multiple processors and/or co-processors, or one or more processors having multiple cores. The processor 58 and memory 62 may be provided on a single application-specific integrated circuit, or the processor 58 and the memory 62 may be provided in separate integrated circuits or other circuits configured to provide functionality for executing program instructions and storing program instructions and other data, respectively. Memory 62 also may be used to store temporary variables or other intermediate information during execution of instructions by processor 58.

Computing device 4 includes communication interface(s) 54, one or more of which may utilize an antenna 56. The communications interface(s) 54 may also include other processing means, such as a digital signal processor and local oscillators. In one example, communications interface(s) 54 include one or more short-range wireless communications subsystems which provide communication between computing device 4 and different systems or devices, such as headset 2. For example, the short-range communications subsystem may include an infrared device and associated circuit components for short-range communication, a near field communications (NFC) subsystem, a Bluetooth subsystem including a transceiver, or a WiFi subsystem. Interconnect 68 may communicate information between the various components of computing device 4.

Memory 62 may include both volatile and non-volatile memory such as random access memory (RAM) and read-only memory (ROM). User authentication information, including personal identification numbers (PINs), finger-print parameters and data, and voice print parameters and data, facial feature parameters, or other biometric data may be stored in memory 62.

Instructions may be provided to memory 62 from a storage device, such as a magnetic device, read-only memory, via a remote connection (e.g., over a network via communication interface(s) 54) that may be either wireless or wired providing access to one or more electronically accessible media. In alternative examples, hard-wired circuitry may be used in place of or in combination with software instructions, and execution of sequences of instructions is not limited to any specific combination of hardware circuitry and software instructions.

Computing device 4 may include operating system code and specific applications code, which may be stored in non-volatile memory. For example the code may include drivers for the computing device 4 and code for managing the drivers and a protocol stack for communicating with the communications interface(s) 54 which may include a receiver and a transmitter and is connected to an antenna 56. Communication interface(s) 54 provides a wireless interface for communication with headset 2.

Communication interface(s) 54 may provide access to a network, such as a local area network. Communication interface(s) 54 may include, for example, a wireless network interface having antenna 56, which may represent one or more antenna(e). In one embodiment, communication interface(s) 54 may provide access to a local area network, for example, by conforming to IEEE 802.11b and/or IEEE 802.11 g standards, and/or the wireless network interface may provide access to a personal area network, for example, by conforming to Bluetooth standards. In addition to, or instead of, communication via wireless LAN standards, communication interface(s) 54 may provide wireless communications using, for example, Time Division, Multiple Access (TDMA) protocols, Global System for Mobile Communications (GSM) protocols, Code Division, Multiple Access (CDMA) protocols, and/or any other type of wireless communications protocol.

Figure 5:
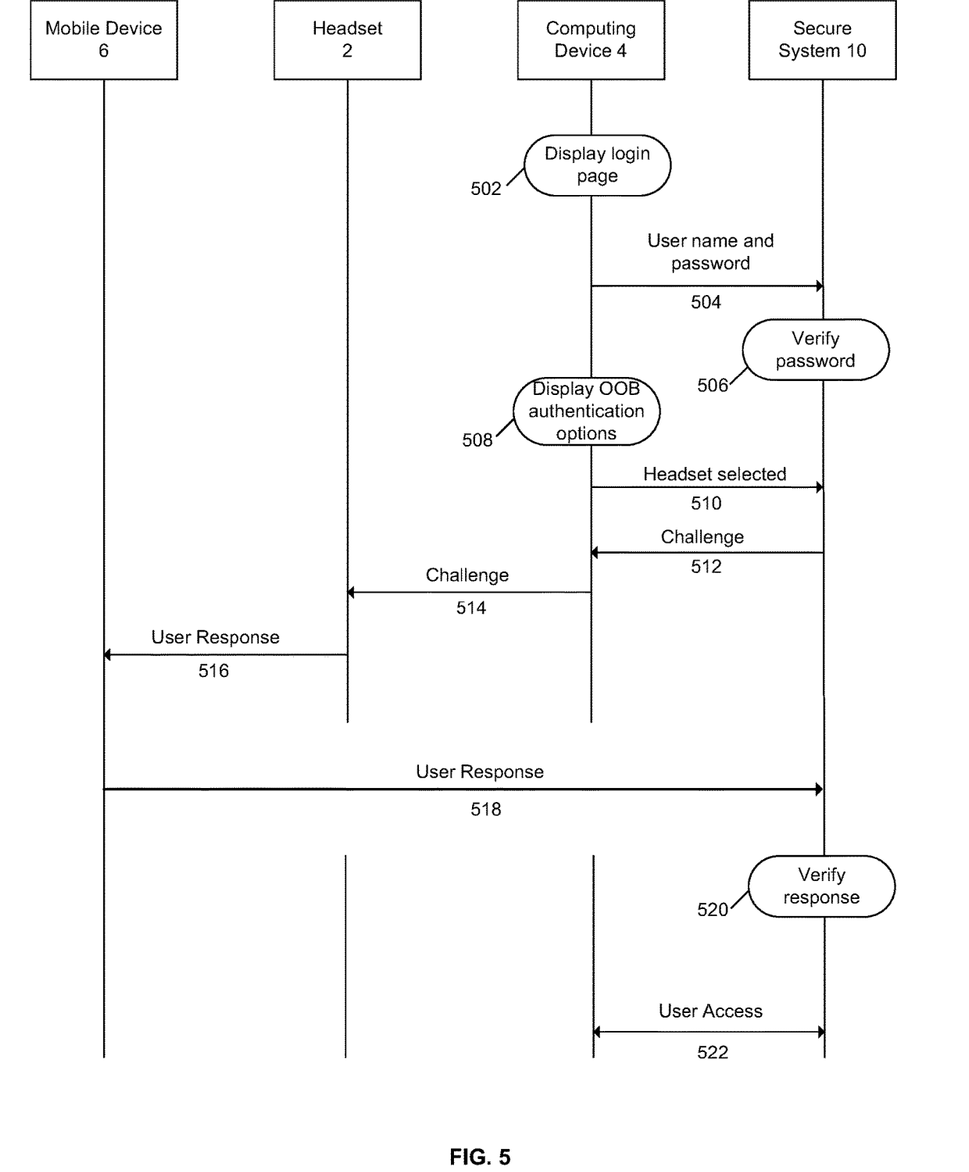
FIG. 5 illustrates authentication of a user to allow the user to access a secure system in the system shown in FIG. 1 in one example.

FIG. 5 illustrates authentication of a user 20 to allow the user 20 to access the secure system 10 (e.g., a secure website) in the system shown in FIG. 1 in one example. For example, network connection 18 and communication link 12 are the in-band channel and communication link 14 and network connection 16 are the out-of-band channel, where headset 2 is advantageously used to enable the out-of-band authentication process. At step 502, a login page is displayed at computing device 4 requesting that user 20 input a user name and password.

At step 504, computing device 4 sends the entered user name and password to the secure system 10. At step 506, the secure system 10 verifies the submitted password. Secure system 10 then requests second factor authentication. At step 508, out of band authentication options are displayed to the user at computing device 4.

If the user 20 selects to use his headset 2, at step 510, computing device 4 sends the selection to the secure system 10. At step 512, secure system 10 sends an authentication challenge to computing device 4. At step 514, computing device 4 sends the authentication challenge to headset 2. At step 516, headset 2 sends a user response received at headset 2 to mobile device 6. At step 518, mobile device 6 sends the user response to secure system 10 in the out of band channel between mobile device 6 and secure system 10 (e.g., network connection 16). At step 520, secure system 10 verifies the user response to the challenge is correct. If the user response is verified, at step 522, user access is granted between computing device 4 and secure system 10.

Figure 6:
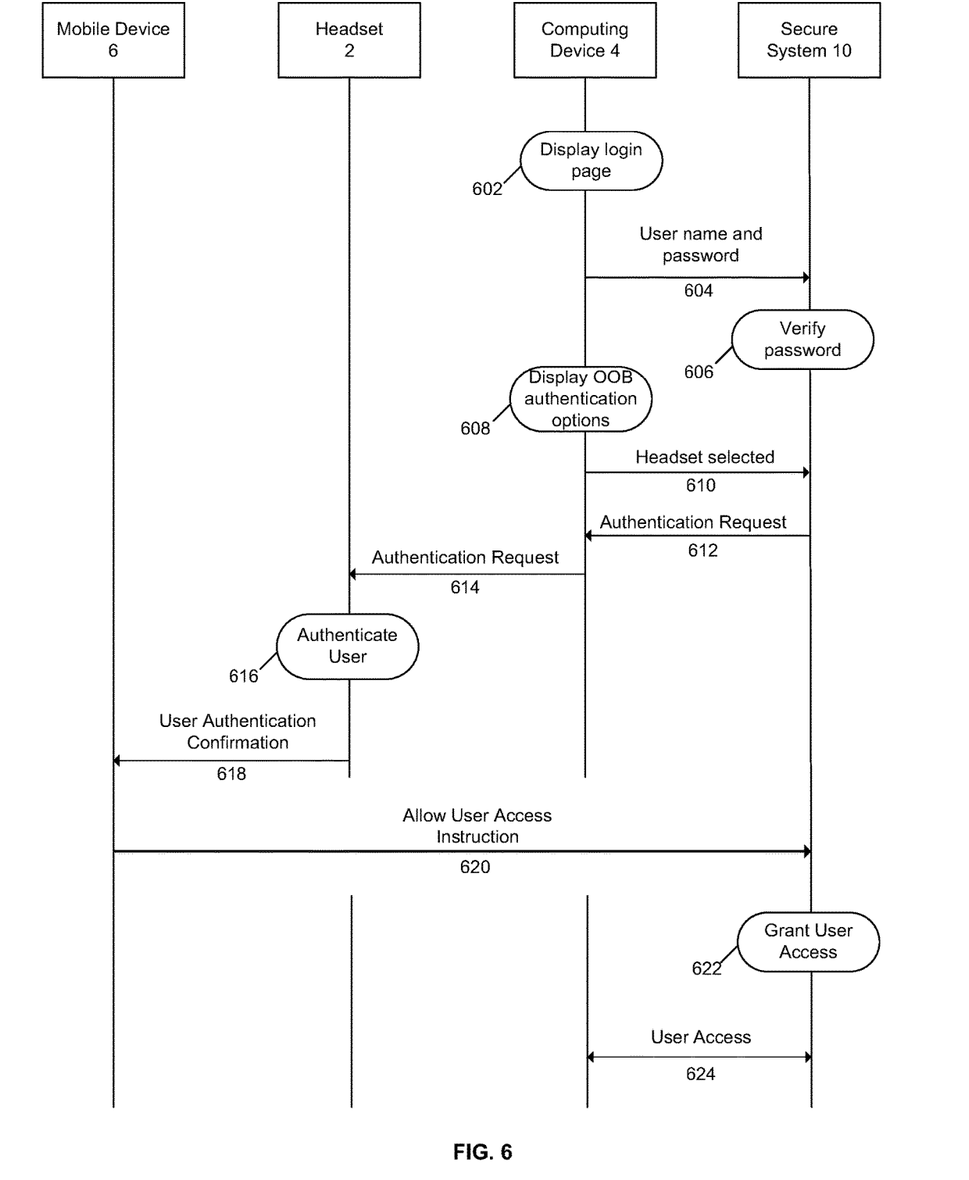
FIG. 6 illustrates authentication of a user to allow the user to access a secure system in the system shown in FIG. 1 in a further example.

FIG. 6 illustrates authentication of a user 20 to allow the user 20 to access the secure system 10 (e.g., a secure website) in the system shown in FIG. 1 in a further example. At step 602, a login page is displayed at computing device 4 requesting that user 20 input a user name and password. At step 604, computing device 4 sends the entered user name and password to the secure system 10.

At step 606, the secure system 10 verifies the submitted password. Secure system 10 then requests second factor authentication. At step 608, out of band authentication options are displayed to the user at computing device 4. If the user 20 selects to use his headset 2, at step 610, computing device 4 sends the selection to the secure system.

At step 612, secure system 10 sends an authentication request to computing device 4. At step 614, computing device 4 sends the authentication request to headset 2. At step 616, headset 2 authenticates the identity of the user. If the user identity is authenticated, at step 618, headset 2 sends the user authentication confirmation to mobile device 6. If the user identity is not authentication, headset 2 sends a user authentication failure message to mobile device 6.

At step 620, mobile device 6 transmits a user authenticated message or an allow user access instruction to secure system 10 in the out of band channel between mobile device 6 and secure system 10 (e.g., network connection 16). At step 622, secure system 10 grants the user access. At step 624, user access exists between computing device 4 and secure system 10.

Figure 7:
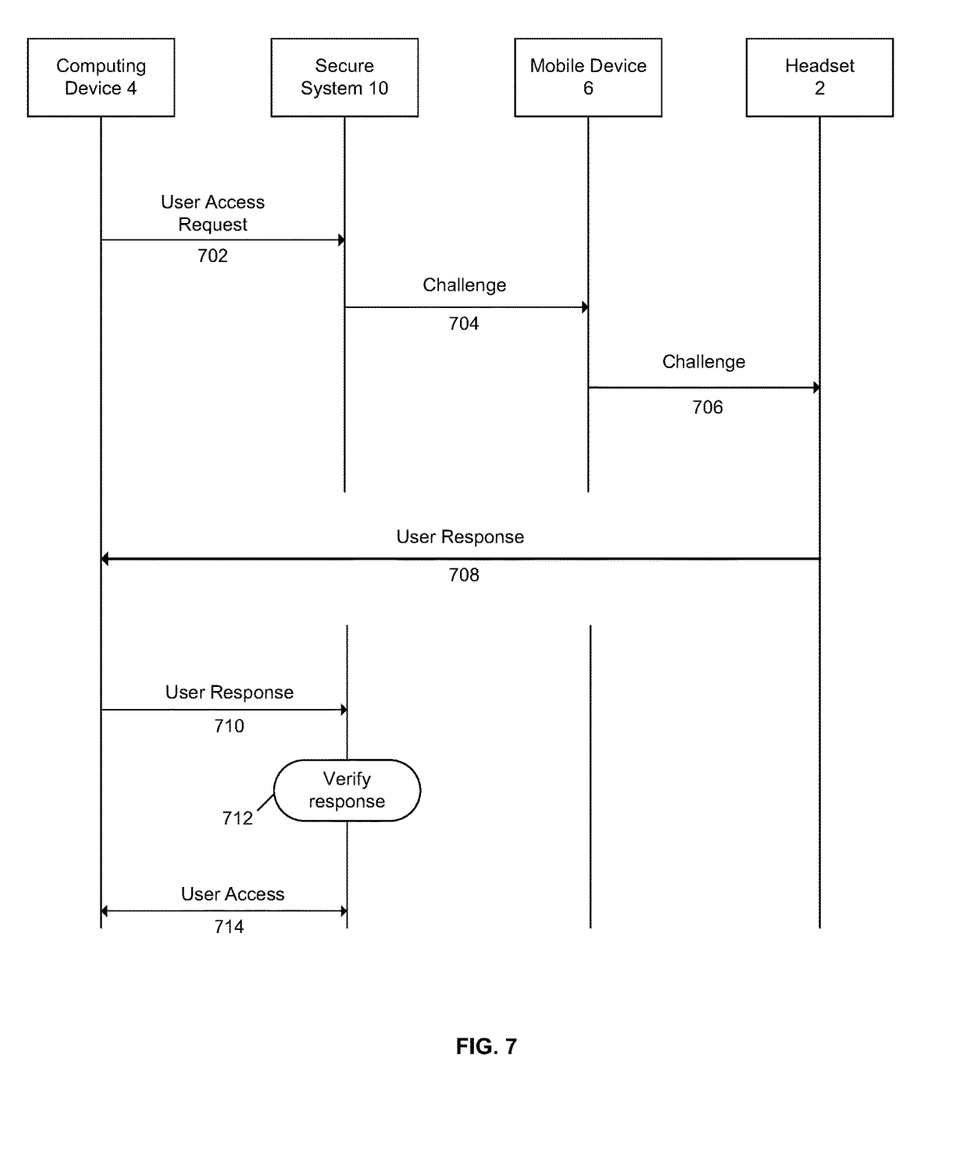
FIG. 7 illustrates authentication of a user to allow the user to access a secure system in the system shown in FIG. 1 in a further example.

FIG. 7 illustrates authentication of a user 20 to allow the user 20 to access the secure system 10 (e.g., a secure website) in the system shown in FIG. 1 in a further example. At step 702, computing device 4 transmits a user access request to secure system 10. At step 704, secure system 10 transmits a user authentication challenge to mobile device 6 in an out of band channel (e.g., network connection 16). At step 706, mobile device 6 sends the authentication challenge to headset 2. At step 708, headset 2 sends a user response received at headset 2 to computing device 4.

At step 710, computing device 4 sends the user response to secure system 10 (e.g., via network connection 18). At step 712, secure system 10 verifies the user response to the challenge is correct. If the user response is verified, at step 714, user access is granted between computing device 4 and secure system 10.

In various embodiments, the techniques of FIGS. 8-9 discussed below may be implemented as sequences of instructions executed by one or more electronic systems. For example, the instructions may be stored by the headset 2 or the instructions may be received by the headset 2 (e.g., via a network connection), or stored by the mobile device 6 or the instructions may be received by mobile device 6. The instructions may be stored by the computing device 4 or the instructions may be received by the computing device 4.

Figure 8:
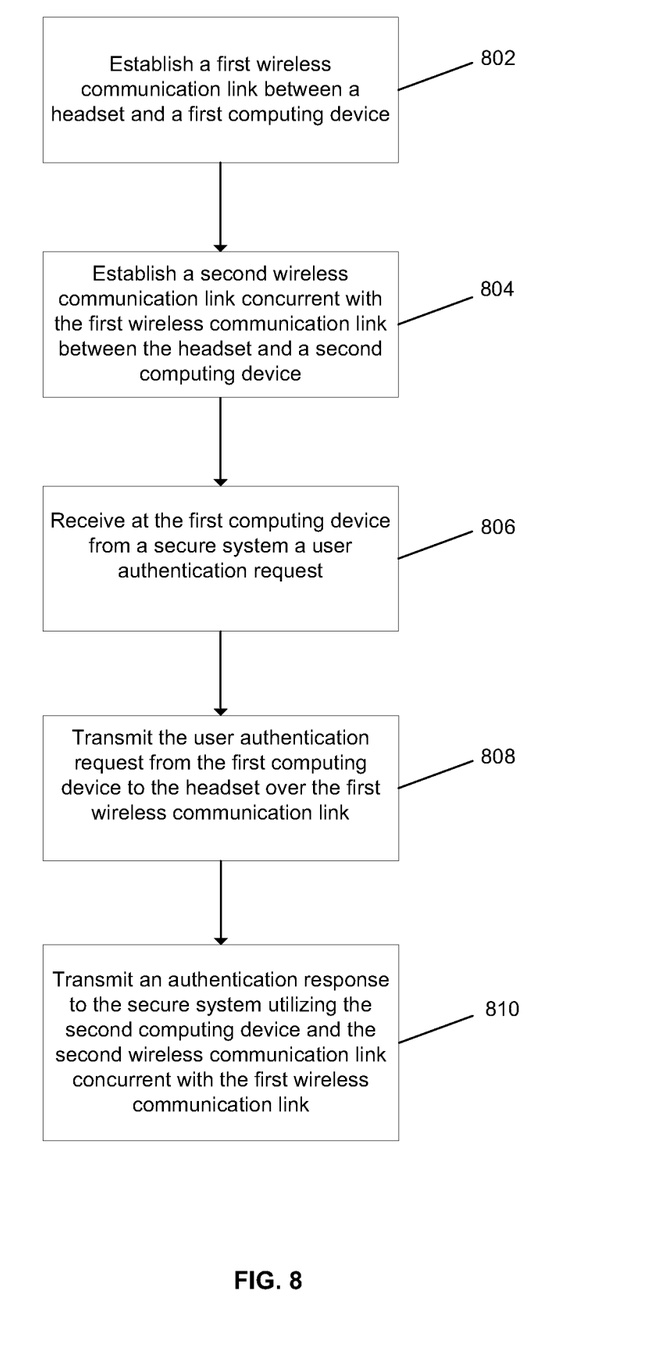
FIG. 8 is a flow diagram illustrating authenticating a user identity in one example.

FIG. 8 is a flow diagram illustrating authenticating a user identity in one example. At block 802, a first wireless communication link between a headset and a first computing device is established. At block 804, a second wireless communication link concurrent with the first wireless communication link is established between the headset and a second computing device.

In one example, the first computing device is a desktop personal computer, laptop computer, or a tablet computer and the second computing device is a smartphone. In one example, the first wireless communication link and the second wireless communication link concurrent with the first wireless communication link comprise Bluetooth communication links.

At block 806, a user authentication request is received at the first computing device from a secure system. In one example, the user may select or have previously selected to use the headset and an out of band channel to authenticate the user identity. At block 808, the user authentication request is transmitted from the first computing device to the headset over the first wireless communication link. In one example, a user response is received at the headset. In various examples, the user response may be a user spoken response or a user biometric input. In one example, the user response is operable to authenticate an identity of the user.

At block 810, an authentication response is transmitted to the secure system utilizing the second computing device and the second wireless communication link concurrent with the first wireless communication link. In one example, the authentication response is sent from the headset to the second computing device over the second wireless communication link concurrent with the first wireless communication link. In one example, the authentication response includes an indication a user identity has been authenticated. In one example, the authentication response is operable to be processed by the secure system to authenticate an identity of the user.

Figure 9:
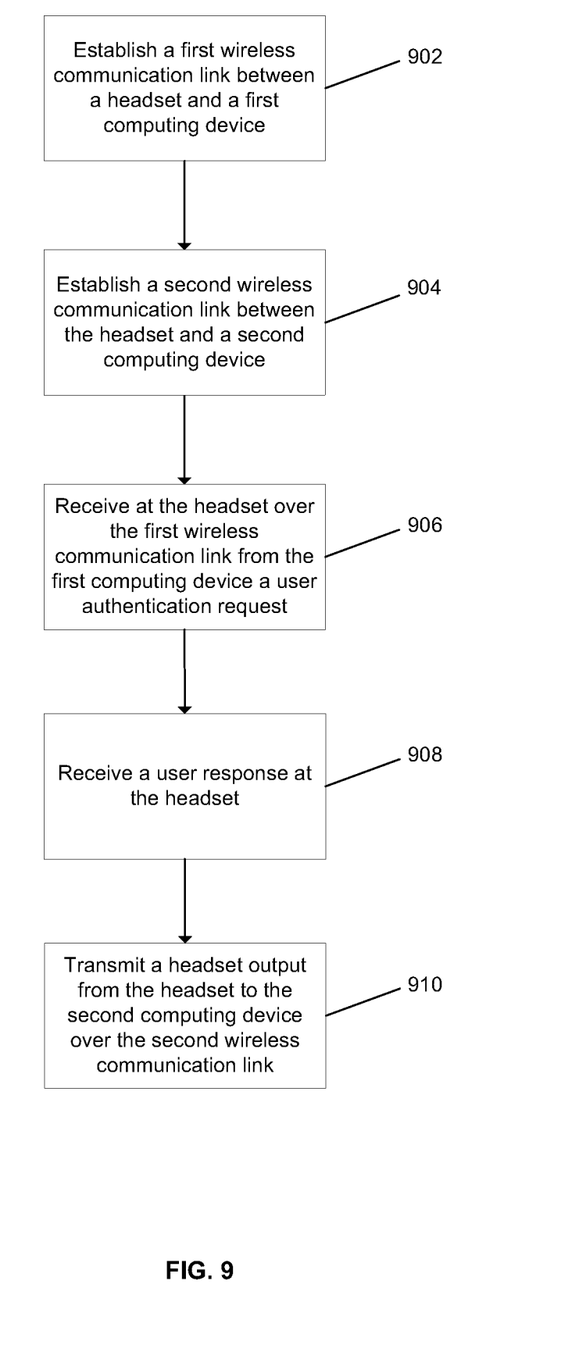
FIG. 9 is a flow diagram illustrating authenticating a user identity in a further example.

FIG. 9 is a flow diagram illustrating authenticating a user identity in a further example. At block 902, a first wireless communication link is established between a headset and a first computing device. At block 904, a second wireless communication link is established between the headset and a second computing device.

In one example, the second wireless communication link between the headset and the second computing device is concurrent with the first wireless communication link between the headset and the first computing device. In one example, the first computing device is a desktop personal computer, laptop computer, or a tablet computer and the second computing device is a smartphone. In one example, the first wireless communication link and the second wireless communication link concurrent with the first wireless communication link comprise Bluetooth communication links.

At block 906, a user authentication request is received at the headset over the first wireless communication link from the first computing device. The user authentication request is received at the first computing device from a secure system. At block 908, a user response is received at the headset. In one example, the user response includes a user spoken response or includes a user biometric input. In one example, the user response is operable to authenticate an identity of the user.

At block 910, a headset output is transmitted from the headset to the second computing device over the second wireless communication link. In one example, the headset output includes an indication a user identity has been authenticated. In one example, the headset output includes the user response received at the headset. The headset output is operable to generate an authentication response sent to the secure system utilizing the second computing device. In one example, the authentication response includes an indication (e.g., a message) a user identity has been authenticated. In one example, the authentication response is operable to be processed by the secure system to authenticate an identity of the user.

While the exemplary embodiments of the present invention are described and illustrated herein, it will be appreciated that they are merely illustrative and that modifications can be made to these embodiments without departing from the spirit and scope of the invention. Acts described herein may be computer readable and executable instructions that can be implemented by one or more processors and stored on a computer readable memory or articles. The computer readable and executable instructions may include, for example, application programs, program modules, routines and subroutines, a thread of execution, and the like. In some instances, not all acts may be required to be implemented in a methodology described herein.

Terms such as "component", "module", "circuit", and "system" are intended to encompass software, hardware, or a combination of software and hardware. For example, a system or component may be a process, a process executing on a processor, or a processor. Furthermore, a functionality, component or system may be localized on a single device or distributed across several devices. The term "headset" includes any head worn device. The described subject matter may be implemented as an apparatus, a method, or article of manufacture using standard programming or engineering techniques to produce software, firmware, hardware, or any combination thereof to control one or more computing devices. References to the Bluetooth protocol include any version of Bluetooth including, but not limited to Bluetooth low energy (which may utilize the Generic Attribute Profile (GATT) or Attribute Profile (ATT)) and Bluetooth Classic.

Thus, the scope of the invention is intended to be defined only in terms of the following claims as may be amended, with each claim being expressly incorporated into this Description of Specific Embodiments as an embodiment of the invention.

What is claimed is:

1. A method for authenticating a user comprising:
    establishing a first wireless communication link between a headset and a first computing device and a second wireless communication link concurrent with the first wireless communication link between the headset and a second computing device;
    receiving at the first computing device from a secure system over a communication link a user authentication request;
    transmitting the user authentication request from the first computing device to the headset over the first wireless communication link; and
    transmitting an authentication response from the headset to the second computing device over the second wireless communication link;
    transmitting the authentication response from the second computing device to the secure system over a third wireless communication link, the third wireless communication link independent from the communication link, the first wireless communication link, and the second wireless communication link.

2. The method of claim 1, wherein the first computing device comprises a desktop personal computer, laptop computer, or a tablet computer and the second computing device comprises a smartphone.

3. The method of claim 1, wherein the first wireless communication link and the second wireless communication link concurrent with the first wireless communication link comprise Bluetooth communication links.

4. The method of claim 1, further comprising receiving a user response at the headset.

5. The method of claim 4, wherein the user response comprises a user spoken response.

6. The method of claim 4, wherein the user response comprises a user biometric input.

7. The method of claim 4, wherein the user response is operable to authenticate an identity of the user.

8. The method of claim 1, wherein the authentication response comprises an indication a user identity has been authenticated.

9. The method of claim 1, wherein the authentication response is operable to be processed by the secure system to authenticate an identity of the user.

10. The method of claim 1, further comprising receiving a user input at the first computing device selecting to use the headset to authenticate a user identity.

11. The method of claim 1, wherein the first wireless communication link utilizes a first communications protocol and the second wireless communication link utilizes a second communications protocol.

12. The method of claim 11, wherein the first communications protocol comprises a Bluetooth communications protocol and the second communications protocol comprises a near field communications (NFC) protocol.

13. A method for authenticating a user comprising:
    establishing a first wireless communication link between a companion device and a first computing device, wherein the companion device is a headset;
    establishing a second wireless communication link between the companion device and a second computing device;
    receiving at the companion device over the first wireless communication link from the first computing device a user authentication request, the user authentication request received at the first computing device from a secure system over a communication link;
    receiving a user response at the companion device;
    transmitting a companion device output from the companion device to the second computing device over the second wireless communication link, the companion device output operable to generate an authentication response sent to the secure system over a third wireless communication link from the second computing device, wherein the third wireless communication link is independent from the communication link, the first wireless communication link, and the second wireless communication link.

14. The method of claim 13, wherein the second wireless communication link between the companion device and the second computing device is concurrent with the first wireless communication link between the companion device and the first computing device.

15. The method of claim 13, wherein the companion device output comprises an indication a user identity has been authenticated.

16. The method of claim 13, wherein the companion device output comprises the user response received at the companion device.

17. The method of claim 13, wherein the authentication response comprises an indication a user identity has been authenticated.

18. The method of claim 13, wherein the authentication response is operable to be processed by the secure system to authenticate an identity of the user.

19. A head worn device comprising:
    a user input interface comprising a microphone;
    a speaker;
    one or more wireless communications transceivers operable to form a first wireless communication link between the head worn device and a first computing device and operable to form a second wireless communication link concurrent with the first wireless communication link between the head worn device and a second computing device;

a processor; and a memory comprising:
- an application program comprising executable instructions which, when executed by the head worn device, cause the head worn device to perform operations comprising:
  - receiving a user authentication request over the first wireless communication link from the first computing device, wherein the user authentication request is received at the first computing device from a secure system over a communication link;
  - receiving a user response at the user input interface; and
  - transmitting a head worn device output over the second wireless communication link concurrent with the first wireless communication link to the second computing device, the head worn device output operable to generate an authentication response sent by the second computing device to the secure system over a third wireless communication link, wherein the third wireless communication link is independent from the communication link, the first wireless communication link, and the second wireless communication link.

20. The head worn device of claim 19, wherein the one or more wireless communications transceivers comprises a Bluetooth communications transceiver.

21. The head worn device of claim 19, wherein the user response is operable to authenticate an identity of a user.

22. The head worn device of claim 19, wherein the head worn device output comprises an indication a user identity has been authenticated.

23. The head worn device of claim 19, wherein the head worn device output comprises the user response received at the head worn device.

24. The head worn device of claim 19, wherein the authentication response comprises an indication a user identity has been authenticated.

25. The head worn device of claim 19, wherein the authentication response is operable to be processed by the secure system to authenticate an identity of a user.

26. The head worn device of claim 19, wherein the one or more wireless communications transceivers comprise a first wireless communications transceiver utilizing a first communications protocol to form the first wireless communication link and a second wireless communications transceiver utilizing a second communications protocol to form the second wireless communication link.

27. The head worn device of claim 26, wherein the first communications protocol comprises a Bluetooth protocol and the second communications protocol comprises a near field communications (NFC) protocol.

28. The head worn device of claim 26, wherein the first communications protocol comprises a Bluetooth Low Energy (BLE) protocol and the second communications protocol comprises a Classic Bluetooth protocol.

* * * * *